(12) United States Patent
Wu et al.

(10) Patent No.: US 9,768,905 B2
(45) Date of Patent: Sep. 19, 2017

(54) OPTICAL LINE TERMINAL (OLT) SUPPORT OF OPTICAL NETWORK UNIT (ONU) CALIBRATION

(71) Applicant: Futurewei Technologies, Inc., Plano, TX (US)

(72) Inventors: Xuming Wu, Wuhan (CN); Dekun Liu, Wuhan (CN); Yuanqiu Luo, Cranbury, NJ (US); Jianhe Gao, Wuhan (CN); Bo Gao, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/713,550

(22) Filed: May 15, 2015

(65) Prior Publication Data
US 2015/0381306 A1    Dec. 31, 2015

Related U.S. Application Data

(60) Provisional application No. 62/016,852, filed on Jun. 25, 2014.

(51) Int. Cl.
*H04J 14/00* (2006.01)
*H04J 14/02* (2006.01)
(Continued)

(52) U.S. Cl.
CPC ...... *H04J 14/0252* (2013.01); *H04B 10/0773* (2013.01); *H04B 10/0775* (2013.01);
(Continued)

(58) Field of Classification Search
CPC ............... H04J 14/0252; H04J 14/0221; H04J 14/0223; H04J 3/14; H04J 14/0246;
(Continued)

(56) References Cited

U.S. PATENT DOCUMENTS 5,940,006 A  *  8/1999  MacLellan ............ G01S 13/825
                                                235/375
2003/0133460 A1     7/2003  Lee et al.
(Continued)

FOREIGN PATENT DOCUMENTS

CN    101127567 A    2/2008
CN    101677418 A    3/2010
(Continued)

OTHER PUBLICATIONS

Foreign Communication From a Counterpart Application, PCT Application No. PCT/CN2015/082367, International Report dated Sep. 24, 2015, 7 pages.
(Continued)

*Primary Examiner* — Hibret Woldekidan
(74) *Attorney, Agent, or Firm* — Conley Rose, P.C.

(57) ABSTRACT

An optical line terminal (OLT) channel termination (CT) comprises a receiver configured to receive an upstream message which comprises a correlation tag from an optical network unit (ONU), wherein the correlation tag represents a unique number, a processor coupled to the receiver and configured to process the upstream message, and generate a downstream message based on the upstream message, wherein the downstream message comprises the correlation tag, and a transmitter coupled to the processor and configured to transmit the downstream message to the ONU.

16 Claims, 3 Drawing Sheets

(51) Int. Cl.
*H04B 10/077* (2013.01)
*H04B 10/272* (2013.01)

(52) U.S. Cl.
CPC ........ *H04B 10/272* (2013.01); *H04J 14/0221* (2013.01); *H04J 14/0223* (2013.01); *H04J 14/0282* (2013.01)

(58) Field of Classification Search
CPC .. H04J 14/025; H04J 14/0282; H04J 14/0241; H04J 3/1694; H04Q 2011/0083; H04Q 2011/0067; H04Q 2011/0079; H04Q 2011/0084; H04Q 2011/0088; H04B 10/0773; H04B 10/0775; H04B 10/272; H04B 2210/072; H04B 10/07957; H04B 10/2503
USPC ........................................... 398/66–72
See application file for complete search history.

(56) References Cited

U.S. PATENT DOCUMENTS

| | | | | |
|---|---|---|---|---|
| 2003/0137975 | A1* | 7/2003 | Song | H04J 3/0652 370/353 |
| 2008/0166127 | A1* | 7/2008 | Kazawa | H04J 14/025 398/79 |
| 2009/0016713 | A1* | 1/2009 | Liu | H04L 12/2697 398/17 |
| 2009/0220226 | A1* | 9/2009 | Hehmann | H04J 3/14 398/25 |
| 2009/0226170 | A1* | 9/2009 | Zou | H04J 3/1694 398/79 |
| 2010/0067913 | A1 | 3/2010 | Niibe et al. | |
| 2011/0142444 | A1* | 6/2011 | Borges | H04L 12/413 398/25 |
| 2012/0072973 | A1* | 3/2012 | Gao | H04L 63/0869 726/5 |
| 2012/0128358 | A1* | 5/2012 | Zhang | H04B 10/0773 398/63 |
| 2012/0287856 | A1* | 11/2012 | Ketchum | H04L 29/06 370/328 |
| 2014/0126910 | A1* | 5/2014 | Luo | H04J 14/0227 398/67 |
| 2015/0043908 | A1* | 2/2015 | Prause | H04B 10/07955 398/34 |
| 2015/0156014 | A1* | 6/2015 | Shaffer | H04L 9/0819 380/256 |

FOREIGN PATENT DOCUMENTS

| | | |
|---|---|---|
| EP | 2043287 A2 | 1/2009 |
| EP | 2768160 A1 | 8/2014 |
| EP | 2863564 A1 | 4/2015 |
| WO | 2009098150 A1 | 8/2009 |
| WO | 2012136155 A1 | 10/2012 |
| WO | 2013053248 A1 | 4/2013 |
| WO | 2013185306 A1 | 12/2013 |

OTHER PUBLICATIONS

Foreign Communication From a Counterpart Application, PCT Application No. PCT/CN2015/082367, Written Opinion dated Sep. 24, 2015, 4 pages.

"Draft New Recommendation ITU-T G.989.3, 40-Gigabit-Capable Passive Optical Networks (NG-PON2): Transmission Convergence Layer," International Telecommunication Union Telecommunication Standardization Sector, Study Group 15, TD 289 Rev.3 (PLEN/15), Question 2/15, 2013-2016, 261 pages.

Foreign Communication From A Counterpart Application, European Application No. 15812850.4, Extended European Search Report dated Jun. 2, 2017, 8 pages.

\* cited by examiner

OPTICAL LINE TERMINAL (OLT) SUPPORT OF OPTICAL NETWORK UNIT (ONU) CALIBRATION

CROSS-REFERENCE TO RELATED APPLICATIONS

This application claims priority to U.S. provisional patent application No. 62/016,852 filed Jun. 25, 2014 by Xuming Wu, et al., and titled "Optical Line Terminal (OLT) Support of Optical Network Unit (ONU) Calibration," which is incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over the last mile, which is the final portion of a telecommunications network that delivers communication to customers. A PON is a point-to-multipoint (P2MP) network comprised of an optical line terminal (OLT) at a central office (CO), an optical distribution network (ODN), and optical network units (ONUs) at the user premises. PONs may also comprise remote nodes (RNs) located between the OLTs and the ONUs, for instance at the end of a road where multiple customers reside.

In recent years, time-division multiplexing (TDM) PONs such as gigabit-capable PONs (GPONs) and Ethernet PONs (EPONs) have been deployed worldwide for multimedia applications. In TDM PONs, the total capacity is shared among multiple users using a time-division multiple access (TDMA) scheme, so the average bandwidth for each user may be limited to below 100 megabits per second (Mb/s).

Wavelength-division multiplexing (WDM) PONs are considered a very promising solution for future broadband access services. WDM PONs can provide high-speed links with dedicated bandwidth up to 10 gigabits per second (Gb/s). By employing a wavelength-division multiple access (WDMA) scheme, each ONU in a WDM PON is served by a dedicated wavelength channel to communicate with the CO or the OLT. Next-generation PONs (NG-PONs) and NG-PON2s may include point-to-point WDM PONs (P2P-WDM PONs), which may provide data rates higher than 10 Gb/s.

NG-PONs and NG-PON2s may also include time- and wavelength-division multiplexing (TWDM) PONs, which may also provide data rates higher than 10 Gb/s. TWDM PONs may combine TDMA and WDMA to support higher capacity so that an increased number of users can be served by a single OLT with sufficient bandwidth per user. In a TWDM PON, a WDM PON may be overlaid on top of a TDM PON. In other words, different wavelengths may be multiplexed together to share a single feeder fiber, and each wavelength may be shared by multiple users using TDMA.

SUMMARY

In one embodiment, the disclosure includes an OLT channel termination (CT) comprising a receiver configured to receive an upstream message which comprises a correlation tag from an ONU, wherein the correlation tag represents a unique number, a processor coupled to the receiver and configured to process the upstream message, and generate a downstream message based on the upstream message, wherein the downstream message comprises the correlation tag, and a transmitter coupled to the processor and configured to transmit the downstream message to the ONU.

In another embodiment, the disclosure includes an ONU comprising a transmitter configured to transmit an upstream message to an OLT CT, wherein the upstream message comprises a correlation tag, wherein the correlation tag represents a unique number, and a receiver coupled to the transmitter and configured to receive a downstream message from the OLT CT, wherein the downstream message comprises the correlation tag.

In yet another embodiment, the disclosure includes a method for ONU online calibration, comprising receiving an upstream message from an ONU, wherein the upstream message comprises a correlation tag, wherein the correlation tag represents a unique number, generating a downstream message based on the upstream message, wherein the downstream message comprises the correlation tag, and transmitting the downstream message to the ONU.

In yet another embodiment, the disclosure includes another method for ONU online calibration, comprising transmitting an upstream message to an OLT CT, wherein the upstream message comprises a correlation tag, wherein the correlation tag represents a unique number, and receiving a downstream message from the OLT CT, wherein the downstream message comprises the correlation tag.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Prior PON technologies are single-wavelength PONs and employ an OLT with a single OLT CT, which is an OLT port communicating with ONUs. Therefore, the prior PON technologies do not support ONU wavelength tuning. NG-PONs and NG-PON2s, including multiple-wavelength PONs such as WDM PONs, P2P-WDM PONs, and TWDM PONs may have multiple OLT CTs in order to support the multiple wavelengths. Each OLT CT may provide data transmission in a pair of upstream and downstream wavelengths. Upstream may refer to the direction of communication from an ONU to the OLT. Downstream, on the other hand, may refer to the direction of communication from the OLT to the ONU.

In a typical TWDM PON, there may be up to eight wavelengths in both the downstream direction and the upstream direction. Calibration is a process of adjusting the wavelength of upstream optical signals that an ONU transmits within a specific error margin. Calibration may be necessary for an un-calibrated ONU or an already-calibrated or pre-calibrated ONU that is experiencing performance degradation. Offline calibration may refer to calibration when an ONU is pre-calibrated before registering with a PON. The ONU may know the wavelengths of all working upstream wavelength channels and know how to calibrate itself to transmit in a specific channel. Online calibration may refer to calibration when the ONU must register with the PON in order to determine from an OLT which upstream wavelength channel to use. The ONU may not know the wavelengths of any working upstream wavelength channels or know how to calibrate itself to transmit in a specific upstream wavelength channel.

Existing standard draft, International Telecommunication Union Telecommunication (ITU-T) Standardization Sector G.989.3 (draft ITU-T G.989.3) discloses a process for ONU online calibration. After powering up, the ONU conducts downstream scanning and calibration. The ONU chooses a downstream channel for upstream channel calibration. The ONU learns the system and channel profiles from the chosen downstream channel. As part of the calibration, the ONU sends an upstream message to the OLT.

However, a direct response to the upstream message from the OLT to the ONU is not provided in the draft ITU-T G.989.3. Therefore, the ONU doesn't have enough information for online calibration. For example, the ONU doesn't know if the upstream wavelength of the ONU is correct, if the ONU needs to calibrate more upstream wavelength channels, and if the ONU is ready to activate the upstream wavelength channel for operation.

Disclosed herein are embodiments for online calibration of an ONU. The ONU transmits an upstream message to an OLT CT, which comprises a unique index number. The OLT CT receives the upstream message and transmits a downstream message based on the upstream message to the ONU, which comprises the unique index number. Both the upstream message and the downstream message may be physical layer operation, administration and maintenance (PLOAM) messages. The disclosed embodiments are respect to a TWDM PON, but may also apply to any PON supporting the ONU online calibration.

Figure 1:
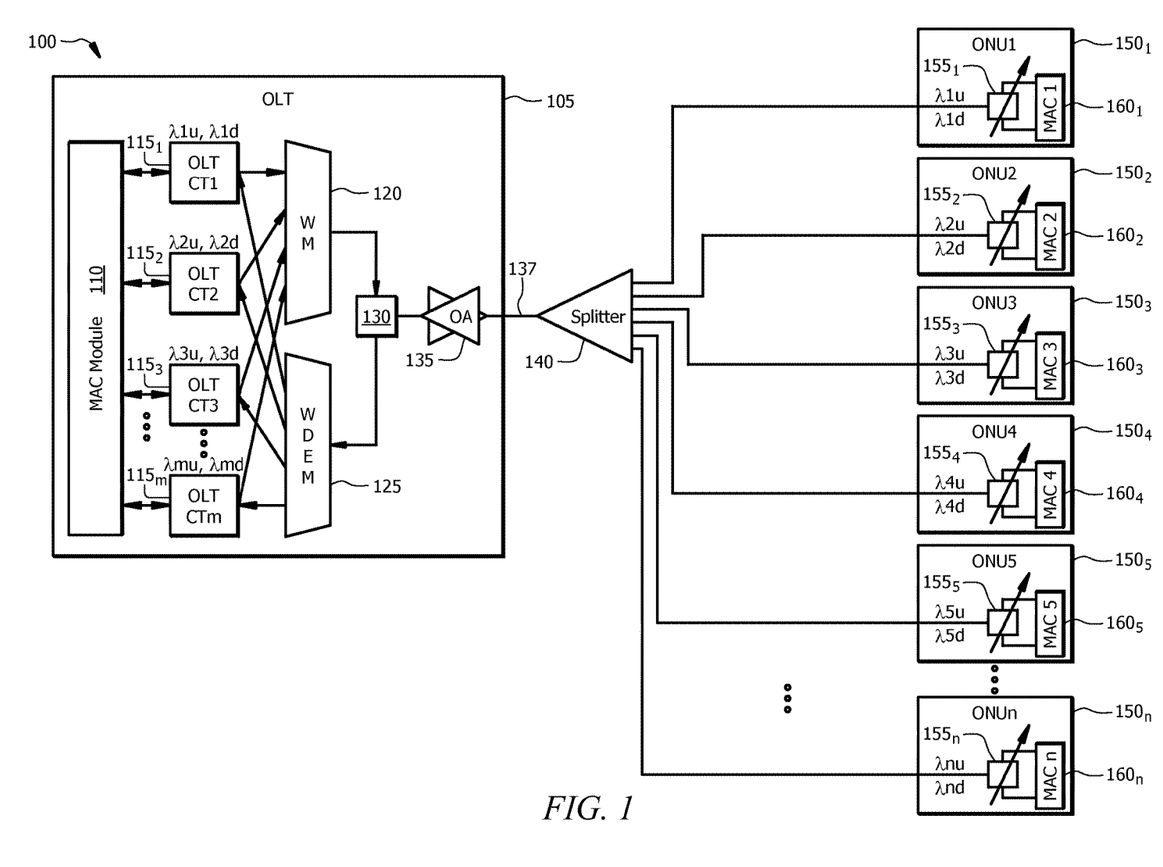
FIG. 1 is a schematic diagram of a TWDM PON.

FIG. 1 is a schematic diagram of a TWDM PON 100. The TWDM PON 100 may be suitable for implementing the disclosed embodiments. The TWDM PON 100 may be a communications network that does not require any active components to distribute data between an OLT 105 and $ONUs_{1-n}$, $150_{1-n}$. Instead, the TWDM PON 100 may use passive optical components to distribute data between the OLT 105 and the $ONUs_{1-n}$ $150_{1-n}$. The TWDM PON 100 may adhere to any standard related to multiple-wavelength PONs. The TWDM PON 100 comprises the OLT 105, a splitter 140, and the $ONUs_{1-n}$ $150_{1-n}$, where n may be any positive integer.

The OLT 105 may be any device configured to communicate with the $ONUs_{1-n}$ $150_{1-n}$ and another network. Specifically, the OLT 105 may act as an intermediary between the other network and the $ONUs_{1-n}$ $150_{1-n}$. For instance, the OLT 105 may forward data received from the network to the $ONUs_{1-n}$ $150_{1-n}$ and may forward data received from the $ONUs_{1-n}$ $150_{1-n}$ to the other network. When the other network uses a network protocol that differs from the PON protocol used in the TWDM PON 100, the OLT 105 may comprise a converter that converts the network protocol to the PON protocol. The OLT 105 converter may also convert the PON protocol into the network protocol.

The OLT 105 may comprise a media access control (MAC) module 110, OLT $CT_{1-m}$ $115_{1-m}$, a wavelength multiplexer (WM) 120, a wavelength demultiplexer (WDEM) 125, a local oscillator (LO) 130, and a bi-directional optical amplifier (OA) 135. The MAC module 110 may be any module suitable for processing signals for use at a physical layer in a protocol stack. The WM 120 may be any suitable wavelength multiplexer, such as an arrayed waveguide grating (AWG). The WM 120 may multiplex the wavelength channels and thus combine the signals into a combined transmitted signal, then forward the combined transmitted signal to the LO 130. The LO 130 may add characteristics to the combined transmitted signal in order for the $ONUs_{1-n}$ $150_{1-n}$ to properly extract the signals. The LO 130 may then forward the combined transmitted signal to the OA 135, which may amplify the combined transmitted signal as needed in order to forward the combined transmitted signal to a splitter 140 via an optical fiber 137. The OA 135 may also receive a combined received signal from the splitter 140 via the optical fiber 137 and amplify the combined received signal as needed in order to forward the combined received signal to the WDEM 125. The WDEM 125 may be similar to the WM 120 and may demultiplex the combined received signal into multiple optical signals, then forward the multiple optical signals to the OLT $CT_{1-m}$ $115_{1-m}$.

The splitter 140 may be any device suitable for splitting the combined optical signals and forwarding the split signals to the $ONUs_{1-n}$ $150_{1-n}$. The splitter 140 may also be any device suitable for receiving signals from the $ONUs_{1-n}$ $150_{1-n}$, combining those signals into a combined received signal, and forwarding the combined received signal to the OA 135. For example, the splitter 140 splits a downstream optical signal into n split downstream optical signals in the downstream direction (e.g. from the OLT 105 to the $ONUs_{1-n}$ $150_{1-n}$), and combines n upstream optical signals into one combined upstream optical signal in the upstream direction (e.g. from the $ONUs_{1-n}$ $150_{1-n}$ to the OLT 105).

The $ONUs_{1-n}$ $150_{1-n}$ may be any devices suitable for communicating with the OLT 105. The $ONUs_{1-n}$ $150_{1-n}$ may comprise wavelength tunable components $155_{1-n}$ and MAC $modules_{1-n}$ $160_{1-n}$. The wavelength tunable components $155_{1-n}$ comprise wavelength tunable transmitters and wavelength tunable filters (not shown). The MAC $modules_{1-n}$ $160_{1-n}$ are similar to the MAC module 110.

The TWDM PON 100 may provide WDM capability by associating a downstream wavelength (e.g. $\lambda 1d, \lambda 2d, \ldots,$ and $\lambda nd$) and an upstream wavelength (e.g. $\lambda 1u, \lambda 2u, \ldots,$ and $\lambda nu$) with each OLT $CT_{1-m}$ $115_{1-m}$ so that a plurality of wavelengths are present. The TWDM PON 100 may then combine those wavelengths into a single optical fiber 137 and distribute the wavelengths to the ONUs$_{1-n}$ 150$_{1-n}$ through the splitter 140. The TWDM PON 100 may provide TDM as well.

Figure 2:
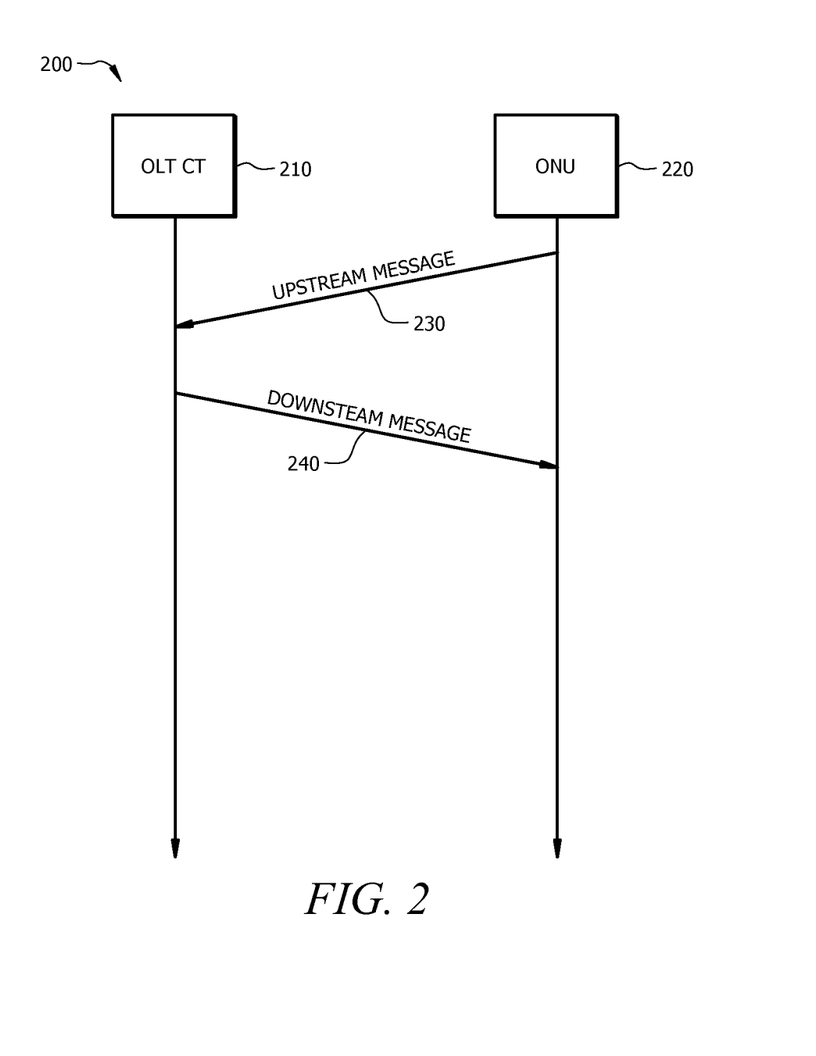
FIG. 2 is a message sequence diagram illustrating ONU online calibration.

FIG. 2 is a message sequence diagram 200 illustrating ONU online calibration. The TWDM PON 100 of FIG. 1 may implement the ONU online calibration. The diagram 200 illustrates messages exchanged between an OLT CT 210 and an ONU 220. The OLT CT 210 and the ONU 220 may be any OLT CT$_{1-m}$ 115$_{1-m}$ and any ONU$_{1-n}$ 150$_{1-n}$.

The ONU 220 initializes and calibrates its receiver and transmitter (not shown). Initialization may comprise self-configuration and ranging to the OLT CT 210. Self-calibration of the transmitter and the receiver may comprise calibrating the wavelengths of upstream optical signals that the transmitter transmits and downstream optical signals the receiver receives by adjusting control parameters including temperature, current, and voltage on the ONU. After the self-calibration, the wavelength of the upstream optical signals that the transmitter of the ONU 220 transmits should match the wavelength of the upstream optical signals that the receiver of the OLT CT 210 receives. Similarly, the wavelength of the downstream optical signals that the receiver of the ONU 220 receives should match the downstream wavelength of the optical signals that the transmitter of the OLT CT 210 transmits.

The ONU 220 transmits the OLT CT 210 an upstream message 230. The upstream message 230 is a PLOAM message and comprises a correlation tag that differentiates the ONU 220 from other ONUs. The correlation tag may represent a unique non-zero number in various forms. For example, the correlation tag may comprise a unique non-zero number in a 16-bit field. The unique non-zero number changes to a different unique non-zero number when the ONU 220 tunes the wavelength, power, or both of the upstream optical signals.

The OLT CT 210 receives the upstream message 230, evaluates the upstream message 230, and transmits a downstream message 240 to the ONU 220. The evaluation of the upstream message 230 includes determining if the ONU 220 transmits the upstream signals with right wavelength and power, if the ONU 220 needs to calibrate more upstream wavelength channels, and if the ONU 220 is ready to be activated for operation under the existing control parameters. The downstream message 240 is also a PLOAM message.

In one embodiment, the downstream message 240 may be a new calibration downstream message created by the OLT CT 210. Table 1 describes parameters of the downstream message 240 according to an embodiment of the disclosure. The downstream message 240 comprises an unassigned ONU identification (ID), a message type ID, a sequence number (SeqNo), a vendor-specific serial number, a message index, a calibration ID, an upstream wavelength channel ID, a received signal strength indicator (RSSI), a padding, and a message integrity check. The message index is the correlation tag copied from the upstream message 230.

The calibration ID comprises "0" bits and a calibration status bit. For example, table 1 shows that the calibration ID comprises 8 bits, 7 "0" bits followed by a calibration status bit. The calibration status bit is decided based on the evaluation of the upstream message 230 of the OLT CT 210. The calibration status bit has a first binary value indicating the ONU 220 should continue calibration, and a second binary value indicating the ONU 220 should be activated for operation, where the first binary value and the second binary value are different. In one embodiment, table 1 shows the first binary value is 0 and the second binary value is 1. In another embodiment, the first binary value may be 1 and the second binary value may be 0.

The upstream wavelength channel ID is either the upstream wavelength channel in which the upstream wavelength is being calibrated when the calibration status bit has the first binary value (e.g. 0 as shown in table 1), or the upstream wavelength channel which is ready for activation when the calibration status bit has the second binary value (e.g. 1 as shown in table 1). The RSSI indicates optical power received from the ONU 220 at the OLT CT 210. The RSSI may be used by the ONU 220 as a reference for online calibration.

TABLE 1

The downstream message according to an embodiment of the disclosure.

| Field | Content | Description |
|---|---|---|
| #1 | Unassigned ONU ID | 10-bit unassigned ONU-ID. |
| #2 | Message Type ID | Message type ID "Calibration". |
| #3 | SeqNo | Broadcast PLOAM sequence number. |
| #4 | Vendor-ID | 32-bit ONU Vendor-ID code, a four-character combination discovered at SN acquisition. |
| #5 | VSSN | 32-bit vendor-specific serial number, a four-byte unsigned integer discovered at SN acquisition. |
| #6 | Message index | Index of the corresponding ONU PLOAM message. |
| #7 | Calibration ID | 0000 000A<br>A - Calibration indication, one bit field with the following significance:<br>A = 0: the ONU should keep on scanning the upstream wavelength.<br>A = 1: the ONU should stop the calibration process, and get ready for the activation process.<br>Other values reserved. |
| #8 | Upstream wavelength channel ID | 0000 UUUU<br>UUUU - Four-bit upstream wavelength Channel ID,<br>When A = 0, this four-bit Channel ID indicates which upstream wavelength Channel the upstream wavelength is in.<br>When A = 1, this four-bit Channel ID indicates which upstream wavelength Channel the ONU should use for activation. |
| #9 | RSSI | These two octets are used to indicate the received optical power at the OLT side from the ONU. |
| #10 | Padding | Set to 0x00 by the transmitter; treated as "don't care" by the receiver. |
| #11 | MIC | Message integrity check. |

In another embodiment, the downstream message 240 may be a revised PLOAM message, for example a revised upstream wavelength channel information (US_WLCH_INFO) PLOAM message or a revised assign_ONU_ID PLOAM message. Table 2 describes parameters of the downstream message 240 according to another embodiment of the disclosure. The downstream message 240 is generated by adding the message index, the calibration ID, the upstream wavelength channel ID, and the RSSI to the existing US_WLCH_INFO PLOAM message.

TABLE 2

The downstream message according to another embodiment of the disclosure.

| Field | Content | Description |
|---|---|---|
| #1 | Unassigned ONU ID | Unassigned ONU ID. |
| #2 | Message Type ID | Message type ID "US_WLCH_INFO". |
| #3 | 0x00 | Sequence number. |
| #4 | Vendor ID | The code set for the Vendor ID is specified in [ATIS-0300220]. The four characters are mapped into the 4-byte field by taking each ASCII/ANSI character code and concatenating them.<br>Example: Vendor_ID = ABCD → Byte 5 = 0x41, Byte 6 = 0x42, Byte 7 = 0x43, Byte 8 = 0x44. |
| #5 | VSSN | Vendor-specific serial number. |
| #6 | UUU0 000O | UUU - Three-bit upstream wavelength Channel ID.<br>O - receiving path indication<br>O = 0, in-band,<br>O = 1, out-of-band. |
| #7 | Message index | Index of the corresponding ONU PLOAM message. |
| #8 | Calibration ID | 0000 000A<br>A - Calibration indication, one bit field with the following significance:<br>A = 0: the ONU should keep on scanning the upstream wavelength.<br>A = 1: the ONU should stop the calibration process, and get ready for the activation process.<br>Other values reserved. |
| #9 | Upstream wavelength channel ID | 0000 UUUU<br>UUUU - Four-bit upstream wavelength Channel ID,<br>When Octet 15 = 0000 0000, this four-bit Channel ID indicates which upstream wavelength Channel the upstream wavelength is in.<br>When Octet 15 = 0000 0001, this four-bit Channel ID indicates which upstream wavelength Channel the ONU should turn to. |
| #10 | RSSI | These two octets are used to indicate the received optical power at the OLT side from the ONU. |
| #11 | Padding | |
| #12 | MIC | Set to 0x00 by transmitter; treated as "don't care" by receiver. |

Table 3 describes parameters of the downstream message 240 according to yet another embodiment of the disclosure. The downstream message 240 is generated by adding the message index, the calibration ID, the upstream wavelength channel ID, and the RSSI to the existing assign_ONU_ID PLOAM message. When the calibration ID is 00000000, the ONU ID should be ignored by the ONU.

TABLE 3

The downstream message according to yet another embodiment of the disclosure.

| Field | Content | Description |
|---|---|---|
| #1 | 0x03FF | 10-bit broadcast ONU-ID. |
| #2 | 0x03 | Message type ID "Assign_ONU-ID". |
| #3 | SeqNo | Broadcast PLOAM sequence number. |
| #4 | ONU ID | LSB-justified 10-bit assigned ONU-ID value padded with 6 MSB zeros; range 0-1022 (0x0000-0x03FE). When field #8 is 0, ONU-ID should be ignored by the ONU. |
| #5 | Vendor ID | 32-bit ONU Vendor-ID code, a four-character combination discovered at SN acquisition. |
| #6 | VSSN | 32-bit vendor-specific serial number, a four-byte unsigned integer discovered at SN acquisition. |
| #7 | Message index | Index of the corresponding ONU PLOAM message. |
| #8 | Calibration ID | 0000 000A<br>A - Calibration indication, one bit field with the following significance:<br>A = 0: the ONU should keep on scanning the upstream wavelength.<br>A = 1: the ONU should stop the calibration process, and get ready for the activation process.<br>Other values reserved. |

TABLE 3-continued

The downstream message according to yet another embodiment of the disclosure.

| Field | Content | Description |
|---|---|---|
| #9 | Upstream wavelength channel ID | UUUU - Four-bit upstream wavelength Channel ID, When Octet 15 = 0000 0000, this four-bit Channel ID indicates which upstream wavelength Channel the upstream wavelength is in. When Octet 15 = 0000 0001, this four-bit Channel ID indicates which upstream wavelength Channel the ONU should turn to. |
| #10 | RSSI | These two octets are used to indicate the received optical power at the OLT side from the ONU. |
| #11 | Padding | Set to 0x00 by the transmitter; treated as "don't care" by the receiver. |
| #12 | MIC | Message integrity check. |

Figure 3:
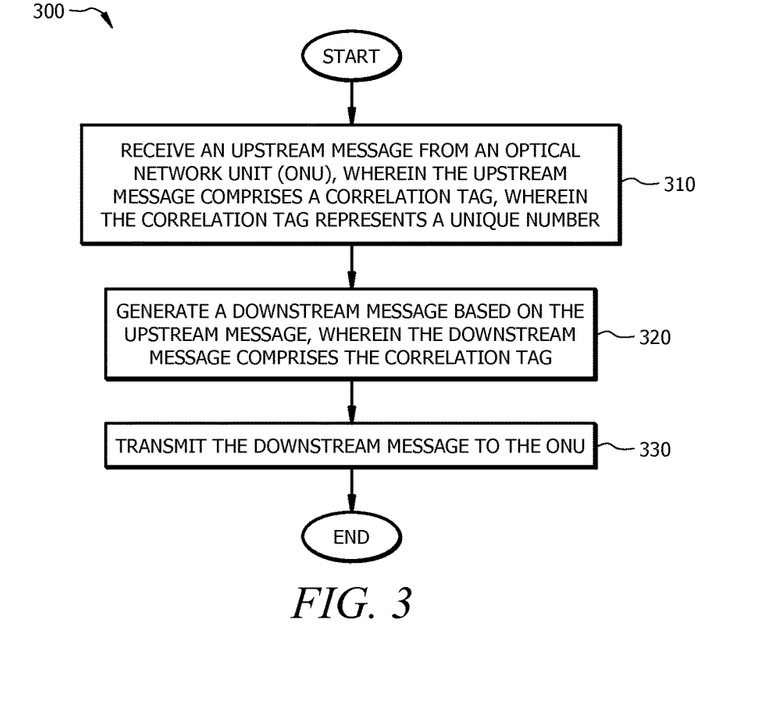
FIG. 3 is a flowchart illustrating a method for ONU online calibration according to an embodiment of the disclosure.

FIG. 3 is a flowchart illustrating a method 300 for ONU online calibration according to an embodiment of the disclosure. The method 300 is implemented in an OLT CT in order to activate the ONU. For example, the OLT CT and the ONU may be the OLT $CT_1$ $115_1$ and the $ONU_1$ $150_1$. In block 310, an upstream message which comprises a correlation tag, is received from an ONU. The correlation tag represents a unique number, which differentiates the ONU from other ONUs. The unique number changes to a different number when the ONU tunes the wavelength, power, or both of the upstream optical signals. In block 320, a downstream message is generated based on the upstream message. The downstream message comprises the correlation tag. In block 330, the downstream message is transmitted to the ONU.

Figure 4:
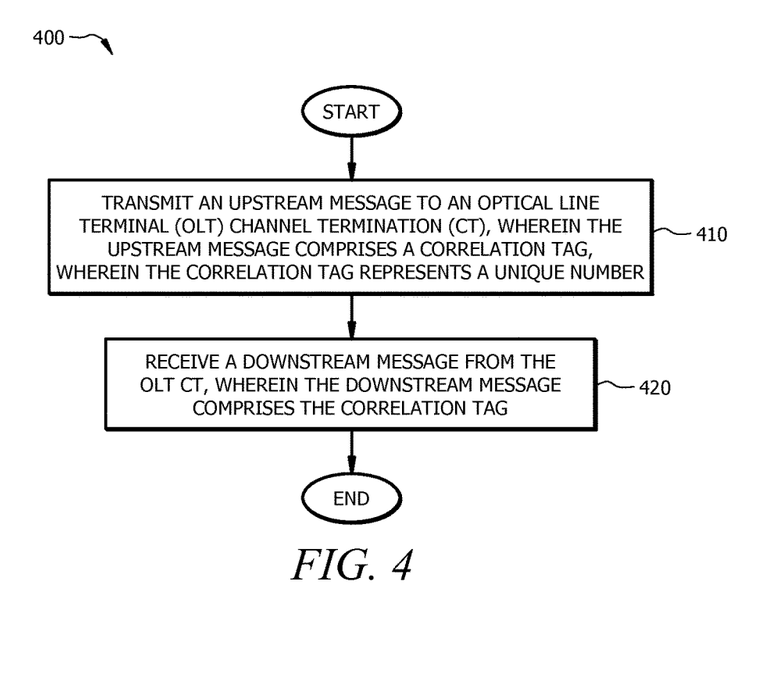
FIG. 4 is a flowchart illustrating another method for ONU online calibration according to an embodiment of the disclosure.

FIG. 4 is a flowchart illustrating another method 400 for ONU online calibration according to an embodiment of the disclosure. The method 400 is implemented in an OLT CT in order to activate the ONU. For example, the OLT CT and the ONU may be the OLT $CT_1$ $115_1$ and the $ONU_1$ $150_1$. In block 410, an upstream message which comprises a correlation tag, is transmit to an OLT CT. The correlation tag represents a unique number, which differentiates the ONU from other ONUs. The unique number changes to a different number when the ONU tunes the wavelength, power, or both of the upstream optical signals. In block 420, a downstream message which comprises the correlation tag is received from the OLT CT.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical line terminal (OLT) channel termination (CT) comprising:
a receiver configured to receive an upstream message from an optical network unit (ONU), wherein the upstream message comprises a correlation tag, wherein the correlation tag represents a unique number that is generated by the ONU for distinguishing an upstream physical layer operation, administration and maintenance (PLOAM) message from the ONU from other PLOAM messages, and wherein the unique number for the ONU changes when the ONU tunes at least one of a wavelength and a power of upstream optical signals transmitted by the ONU;
a processor coupled to the receiver and configured to generate a downstream message based on the upstream message, wherein the downstream message comprises the correlation tag and an upstream passive optical network identification (PON-ID); and
a transmitter coupled to the processor and configured to transmit the downstream message to the ONU.

2. The OLT CT of claim 1, wherein the upstream PON-ID is at least one of a current PON-ID and a target PON-ID, and wherein the upstream PON-ID includes a calibration status bit.

3. The OLT CT of claim 2, wherein the calibration status bit has a first binary value indicating ONU should continue calibration, wherein the calibration status bit has a second binary value indicating the ONU should be activated, and wherein the first binary value and the second binary value are different.

4. The OLT CT of claim 3, wherein the downstream message further comprises a current upstream PON-ID, wherein the current upstream PON-ID indicates that the upstream wavelength is being calibrated and received, and a target upstream PON-ID that indicates a wavelength channel to be calibrated.

5. The OLT CT of claim 4, wherein the downstream message further comprises a received signal strength indicator (RSSI), and wherein the RSSI indicates optical power received from the ONU at the OLT CT.

6. The OLT CT of claim 5, wherein the upstream message and the downstream message are PLOAM messages.

7. An optical network unit (ONU) comprising:
a transmitter configured to transmit an upstream message to an optical line terminal (OLT) channel termination (CT), wherein the upstream message comprises a correlation tag, wherein the correlation tag represents a unique number that is generated b the ONU for distinguishing an upstream physical layer operation, administration and maintenance (PLOAM) message from the ONU from other PLOAM messages, and wherein the unique number for the ONU changes when the ONU tunes at least one of a wavelength and a power of upstream optical signals transmitted by the ONU; and a receiver coupled to the transmitter and configured to receive a downstream message from the OLT CT, wherein the downstream message comprises the correlation tag and an upstream passive optical network identification (PON-ID).

8. The ONU of claim 7, wherein the upstream PON-ID is at least one of a current PON-ID and a target PON-ID, and wherein the upstream PON-ID includes a calibration status bit.

9. The ONU of claim 8, wherein the calibration status bit has a first binary value indicating the ONU should continue calibration, wherein the calibration status bit has a second binary value indicating the ONU should be activated, and wherein the first binary value and the second binary value are different.

10. The ONU of claim 9, wherein the downstream message further comprises a current upstream PON-ID, wherein the current upstream PON-ID indicates that the upstream wavelength is being calibrated and received, and a target upstream PON-ID indicates an upstream wavelength channel to be calibrated.

11. The ONU of claim 10, wherein the downstream message further comprises a received signal strength indicator (RSSI), and wherein the RSSI indicates received optical power at the OLT from the ONU.

12. The ONU of claim 11, wherein the upstream message and the downstream message are PLOAM messages.

13. A method for optical network unit (ONU) online calibration, comprising:

receiving an upstream message from an ONU, wherein the upstream message comprises a correlation tag, wherein the correlation tag represents a unique number that is generated by the, ONU for distinguishing an upstream physical layer operation, administration and maintenance (PLOAM) message from the ONU from other PLOAM messages, and wherein the unique number for the ONU changes when the ONU tunes at least one of a wavelength and a power of upstream optical signals transmitted by the ONU;

generating a downstream message based on the upstream message, wherein the downstream message comprises the correlation tag and an upstream passive optical network identification (PON-ID); and transmitting the downstream message to the ONU.

14. The method of claim 13, wherein the upstream PON-ID is at least one of a current PON-ID and a target PON-ID, wherein the upstream PON-ID includes a calibration status bit, wherein the calibration status bit has a first binary value indicating the ONU should continue calibration, wherein the calibration status bit has a second binary value indicating the ONU should be activated, and wherein the first binary value and the second binary value are different.

15. The method of claim 14, wherein the downstream message further comprises a current upstream PON-ID, wherein the current upstream PON-ID indicates that an upstream wavelength is being calibrated and received, and a target upstream PON-ID that indicates a wavelength channel to be calibrated.

16. A method for optical network unit (ONU) online calibration, comprising:

transmitting an upstream message to an optical line terminal (OLT) channel termination (CT), wherein the upstream message comprises a correlation tag, wherein the correlation tag represents a unique number that is generated by the ONU for distinguishing an upstream physical layer operation, administration and maintenance (PLOAM) message from the ONU from other PLOAM messages, and wherein the unique number for the ONU changes when the ONU tunes at least one of a wavelength and a power of upstream optical signals transmitted by the ONU; and receiving a downstream message from the OLT CT, wherein the downstream message comprises the correlation tag and an upstream passive optical network identification (PON-ID).

* * * * *

UNITED STATES PATENT AND TRADEMARK OFFICE
CERTIFICATE OF CORRECTION

PATENT NO. : 9,768,905 B2
APPLICATION NO. : 14/713550
DATED : September 19, 2017
INVENTOR(S) : Xuming Wu et al.

It is certified that error appears in the above-identified patent and that said Letters Patent is hereby corrected as shown below:

In the Claims

Column 10, Lines 43-48, Claim 3 should read:
3. The OLT CT of claim 2, wherein the calibration status bit has a first binary value indicating the ONU should continue calibration, wherein the calibration status bit has a second binary value indicating the ONU should be activated, and wherein the first binary value and the second binary value are different.

Column 10, Lines 61-67, through Column 11, Lines 1-10, Claim 7 should read:
7. An optical network unit (ONU) comprising:
a transmitter configured to transmit an upstream message to an optical line terminal (OLT) channel
    termination (CT), wherein the upstream message comprises a correlation tag, wherein the
    correlation tag represents a unique number that is generated by the ONU for distinguishing an
    upstream physical layer operation, administration and maintenance (PLOAM) message from
    the ONU from other PLOAM messages, and wherein the unique number for the ONU changes
    when the ONU tunes at least one of a wavelength and a power of upstream optical signals
    transmitted by the ONU; and
a receiver coupled to the transmitter and configured to receive a downstream message from the OLT
    CT, wherein the downstream message comprises the correlation tag and an upstream passive
    optical network identification (PON-ID).

Column 11, Lines 33-41, through Column 12, Lines 1-8, Claim 13 should read:
13. A method for optical network unit (ONU) online calibration, comprising:
    receiving an upstream message from an ONU, wherein the upstream message comprises a correlation tag, wherein the correlation tag represents a unique number that is generated by the ONU for distinguishing an upstream physical layer operation, administration and maintenance (PLOAM) message from the ONU from other PLOAM messages, and wherein the unique number for the ONU changes when the ONU tunes at least one of a wavelength and a power of upstream optical signals transmitted by the ONU;

Signed and Sealed this
Seventh Day of November, 2017

Joseph Matal
*Performing the Functions and Duties of the
Under Secretary of Commerce for Intellectual Property and
Director of the United States Patent and Trademark Office* generating a downstream message based on the upstream message, wherein the downstream message comprises the correlation tag and an upstream passive optical network identification (PON-ID); and transmitting the downstream message to the ONU.